United States Patent [19]

Prasad et al.

[11] Patent Number: 4,934,148
[45] Date of Patent: Jun. 19, 1990

[54] DRY, HIGH PURITY NITROGEN PRODUCTION PROCESS AND SYSTEM

[75] Inventors: Ravi Prasad, East Amherst; Oscar W. Haas, Cheektowaga; Harry Cheung, Buffalo, all of N.Y.

[73] Assignee: Union Carbide Corporation, Danbury, Conn.

[21] Appl. No.: 350,848

[22] Filed: May 12, 1989

[51] Int. Cl.⁵ .............................................. F25J 3/02
[52] U.S. Cl. ......................................... 62/24; 55/16; 62/17
[58] Field of Search .................. 55/16, 21; 62/17, 18, 62/23, 24

[56] References Cited

U.S. PATENT DOCUMENTS

| | | |
|---|---|---|
| 3,735,558 | 5/1973 | Skarstrom et al. ...................... 55/16 |
| 3,735,599 | 5/1973 | Izumichi et al. ......................... 62/21 |
| 3,967,464 | 7/1976 | Cromier et al. ......................... 62/13 |
| 4,119,417 | 10/1978 | Heki et al. ............................... 55/158 |
| 4,264,340 | 4/1981 | Sircar et al. ............................. 55/25 |
| 4,448,595 | 5/1984 | Cheung .................................... 62/31 |
| 4,453,957 | 6/1984 | Pahade et al. ........................... 62/25 |
| 4,466,946 | 8/1984 | Goddin, Jr. et al. .................... 67/24 |
| 4,589,888 | 5/1986 | Hiscock et al. .......................... 55/26 |
| 4,594,085 | 6/1986 | Cheung .................................... 62/25 |
| 4,645,516 | 2/1987 | Doshi ....................................... 55/16 |
| 4,654,047 | 3/1987 | Hopkins et al. ......................... 62/23 |
| 4,687,498 | 8/1987 | Maclean et al. ......................... 62/17 |
| 4,690,695 | 9/1987 | DOshi ....................................... 55/16 |
| 4,701,187 | 10/1987 | Choe et al. ............................... 55/16 |
| 4,718,921 | 1/1988 | Makino et al. ........................... 55/16 |
| 4,761,167 | 8/1988 | Nicholas et al. ......................... 62/17 |

FOREIGN PATENT DOCUMENTS 0226431  6/1987  European Pat. Off. .

OTHER PUBLICATIONS

Gas Separation by Permeation, C-Y Pan et al., The Canadian Journal of Chemical Engineering, vol. 56, Apr. 1978, pp. 197-209.
Gas Separation by Permeators with High-Flux Asymmetric Membranes-C-Y Pan, AIChE Journal, vol. 29, No. 4, Jul. 1983, pp. 545-552.
Asymmetric Cellulose Acetate Hollow Fibers: Studies in Gas Permeation, M. Sidhoum et al. AIChE Journal, Mar. 1988, vol. 34 No. 3, pp. 417-425.
C&EN, Apr. 29, 1985, p. 16 "Monsanto Tests Separators for Dehydration".
C&EN, Jul. 18, 1988, p. 35 "Membrane-Based Compressed Air Dryer".

*Primary Examiner*—Ronald C. Capossela
*Attorney, Agent, or Firm*—Alvin H. Fritschler

[57] ABSTRACT

Feed air to a prepurifier adsorption system/cryogenic air separation system for dry, high purity nitrogen and/or oxygen production is dried in a membrane dryer preferably characterized by a countercurrent flow path. Drying is enhanced by the use of purge gas on the permeate side of the membrane dryer, which adsorption system or cryogenic air separation system product or waste gas, dried feed air or ambient air being used as purge gas.

17 Claims, 2 Drawing Sheets

DRY, HIGH PURITY NITROGEN PRODUCTION PROCESS AND SYSTEM

BACKGROUND OF THE INVENTION

1. Field of the Invention

The invention relates to the cryogenic separation of air. More particularly, it relates to the pretreatment of feed air to cryogenic air separation systems.

2. Description of the Prior Art

Nitrogen and oxygen are desired for many chemical processing, refinery, metal production and other industrial applications. While various techniques are known for the production of nitrogen and/or oxygen by air separation, cryogenic distillation processes and systems are widely used for the production of nitrogen and/or oxygen from air, or for the removal of nitrogen from well gases. In each cryogenic application, high freezing point contaminants, which would otherwise solidify at the low temperatures at which the primary gas separation takes place, must be removed from the compressed feed gas stream. Such contaminants are commonly removed by refrigeration/adsorption process combinations well known in the art. In air separation operations, this pre cleanup can utilize a reversing heat exchanger and cold end gel trap combination, or a mechanical air chiller/zeolite molecular sieve adsorber combination. In the former type of processing unit, virtually all of the contaminants are frozen out of the feed air when the feed air when said air is thermally exchanged against the cryogenic waste and product gas streams. Unfortunately, however, the self cleaning of the reversing heat exchanger unit requires a large purge gas flow relative to the air feed. As a result, the air recovery of such cleanup cycles tends to be undesirably limited Reversing heat exchanger units also require large valves, which must open and close on a cyclic basis, switching the air feed and waste purge flow passages. The valves are often located within the insulated cold box portion of the cryogenic system, making maintenance difficult. Furthermore, to act effectively, the heat exchange-gel trap combination must operate at low temperature, and thus requires a considerable cool down period during plant start-up.

In contrast to reversing heat exchanger and gel trap combinations, mechanical chiller/adsorptive unit combinations, as disclosed in Prentice, U.S. 4,375,367, can supply a clean, dry feed air stream within minutes of start-up. The mechanical chiller reduces the air temperature to about 40° F. from the compressor aftercooler temperature of from about 80° F. to about 115° F. The air, which is saturated at the higher temperatures, loses the bulk of its water burden through condensation, thus reducing the inlet water concentration to the adsorptive unit. The adsorption operation is typically carried out using a pair of pressure vessels, one bed being used for adsorbing purposes, while the other is undergoing regeneration. The pressure vessels are filled with an adsorbent material, such as alumina, zeolite molecular sieve or silica gel, which removes the remaining water vapor, carbon dioxide and/or other contaminants from the feed air stream. The adsorbent beds are usually regenerated at near ambient pressure with a contaminant free stream, either a portion of the cryogenic waste or dry air, which may be heated to improve its desorbing capability. The operation of the mechanical chiller substantially improves the performance of the adsorber beds by increasing their adsorption capacity, reducing the inlet water concentration, and, consequently, the purge flow and energy requirements of the operation. The mechanical chiller is limited to a minimum product dewpoint of about 38° F. due to the necessity for avoiding the buildup of ice on the tubing walls. The chillers must also be followed by a moisture separator to remove the condensate formed from the feed air and to protect the adsorbent beds from excessive moisture. The mechanical chillers used in such operations tend to be expensive in terms of capital and power requirements, especially for small plants. In addition, such chillers are generally known for requiring expensive maintenance.

In light of such factors, there has been a desire in the art for new processes and systems that would either eliminate or modify the function of the components referred to above, particularly the mechanical chiller and moisture separator so as to more economically provide clean, dry air to a cryogenic gas separation unit. One approach considered with interest is the use of membrane systems to selectively permeate water from feed air. Certain materials are well known as being capable of selectively permeating water, while air or other gases, comprising less permeable components, are recovered as non-permeate gas. A membrane system utilizing such a material would replace the function of the mechanical chiller. Such membrane systems are well known to be relatively simple and easy to operate and maintain. As such membrane systems are normally operated, however, the removal of moisture from the feed stream requires the co-permeation of significant amounts of valuable product gas. Operation of membrane systems at stage cuts on the order of 10 to 20% might be required to achieve the dewpoint level achieved by the use of a mechanical chiller. Such circumstance would, as a result, reduce the overall process recovery level achievable, increase the power requirements of the process, and be generally unattractive from an economic viewpoint. Despite such factors serving to deter the use of membrane dryer systems in place of mechanical chillers or said reversing heat exchanger and gel trap combinations, the use of membrane dryer systems in new, improved overall processes and systems, eliminating the need for the presently employed techniques, would represent a desirable advance in the art.

It is an object of the invention, therefore, to provide an improved process and system for the production of dry nitrogen and/or oxygen product.

It is another object of the invention to provide an improved process and system utilizing cryogenic systems for gas separation and providing for desired for the use of a membrane system for the removal of moisture from the feed gas.

It is a further object of the invention to provide a membrane dryer system capable of achieving enhanced drying efficiency in an overall process and system for the recovery of dry nitrogen and/or oxygen using a cryogenic system for air separation.

With those and other objects in mind, the invention is hereinafter described in detail, the novel features thereof being particularly pointed out in the appended claims.

SUMMARY OF THE INVENTION

A membrane dryer system is employed in conjunction with an adsorption unit-cryogenic gas separation unit system to achieve a desired production of dry nitrogen and/or oxygen product. The membrane dryer is preferably operated with a countercurrent flow pattern and is refluxed on the low pressure permeate side thereof. Waste gas from the cryogenic unit is used as purge gas. The area requirements of the membrane are thereby reduced, and the desired product recovery is appreciably increased.

BRIEF DESCRIPTION OF THE DRAWING

The invention is hereinafter described in detail with reference to the accompanying drawings in which.

DETAILED DESCRIPTION OF THE INVENTION

The objects of the invention are accomplished by the integration of a membrane system for feed air drying with a downstream adsorption-cryogenic air separation system under conditions enabling desired moisture removal from the feed air to be accomplished without reduction in the overall product recovery of the process and system to unacceptable levels. Such conditions advantageously relate to the integration of the separate processing systems, the selectivity for moisture removal of the particular membrane composition employed, and membrane bundle design conditions under which countercurrent flow is desirably achieved in the membrane dryer system. This enables nitrogen and/or oxygen to be recovered in dry form with minimum loss of said product during the drying operation.

In the practice of the invention, waste gas from the cryogenic air separation system is used to provide purge gas to a membrane dryer system and to the adsorption system upstream of said cryogenic system. The invention enables a dry, high purity nitrogen and/or oxygen product stream to be obtained with minimum loss of desired product because of the requirements of the drying operation. The overall process and system of the invention is illustrated with reference to the drawings. Further information relating to the overall cryogenic systems used in the practice of the invention, and the membrane systems integrated therewith to achieve enhanced drying of feed air are provided below.

Figure 1:
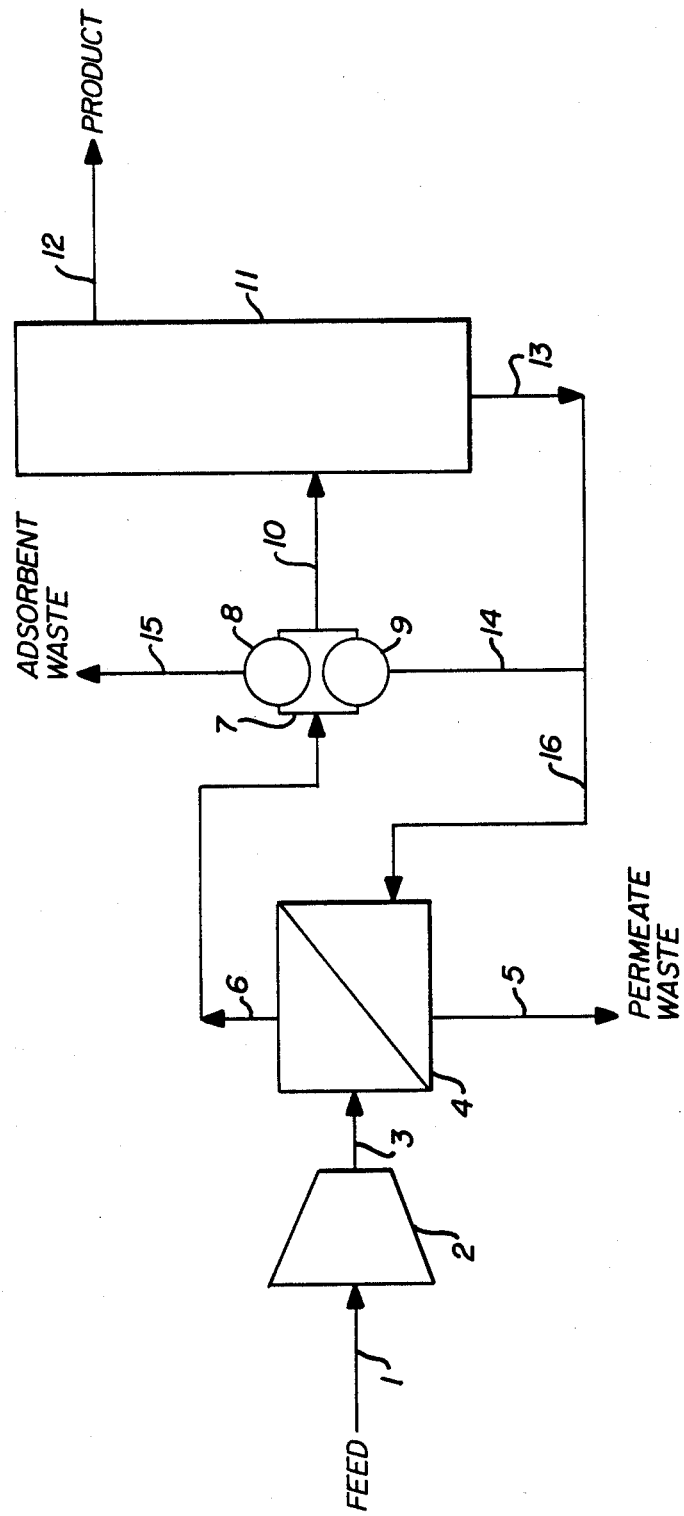
FIG. 1 is a schematic flow diagram of an embodiment of the invention in which the waste gas from the cryogenic feed gas separation system is employed as purge gas for a membrane system for the drying of the feed gas to the cryogenic system.

In FIG. 1 of the drawings, feed air is passed in line 1 to air compressor 2, from which wet compressed air is passed in line 3 to membrane dryer system 4. In said membrane system 4, water selectively permeates through the membrane material and is discharged from the system as waste gas through line 5. Feed air is recovered from membrane dryer system 4 as dry, non permeate or retentate gas through line 6 for passage to adsorption system 7, which is used to remove contaminants from the dry feed air prior to the passage of said feed air to the cryogenic air separation system. Adsorption system 7 is shown as including two beds of adsorbent material, i.e. beds 8 and 9, one bed generally being used for its intended adsorption purposes while the other bed is being regenerated. The dry, purified feed gas is passed from said adsorption system 7 in line 10 to cryogenic air separation system 11, from which the desired dry, high purity product gas is recovered through line 12. A dry waste stream from said cryogenic system is withdrawn through line 13. A portion of this dry waste stream, i.e oxygen or nitrogen, is withdrawn through line 14 for passage through adsorption system 7, that is through either bed 8 or bed 9, as dry adsorbent purge gas for the bed undergoing regeneration. An adsorbent waste stream is withdrawn from adsorption system 7 through line 15, said waste stream containing the adsorbent purge gas and contaminants desorbed from the adsorbent beds during the regeneration thereof. The remaining portion of the dry waste gas from cryogenic air separation system 11 is passed through line 16 for introduction to membrane dryer system 4 as a dry purge gas on the lower pressure, permeate side of said membrane system. Said dry purge gas is used to facilitate the removal of permeate waste gas from the surface of the membrane, and is discharged, together with said permeate gas, through line 5.

The embodiment of the invention illustrated in FIG. 1 serves to eliminate the need for a chiller otherwise employed as part of a chiller/adsorbent bed combination for the removal of water and carbon dioxide from the compressed air streams of conventional pre purified cryogenic air separation plants. Such elimination of the chiller is desirable, as indicated above, because it is expensive in terms of both capital and power and because it is well known for requiring extensive maintenance. The membrane dryer system used in the practice of the invention, on the other hand, is well known as being very simple and inexpensive in nature, and not requiring extensive maintenance. While this embodiment of the invention, integrating membrane systems with adsorption cryogenic air separation systems, is an advantageous advance over conventional pre purified cryogenic air separation systems, further development in the art is also desirable. One limitation of the FIG. 1 embodiment of the invention is that the permeate purge gas requirements for the membrane dryer system, which typically are approximately 10–20% of the feed air to said membrane dryer system, are in addition to the 10–15% purge requirements for the pre-purifier adsorption system. Consequently, the relatively large overall purge requirements of the system, approximately 20–35%, make it difficult to achieve high recovery of nitrogen and oxygen in cryogenic air separation systems when such large amounts of waste gas are not available.

Figure 2:
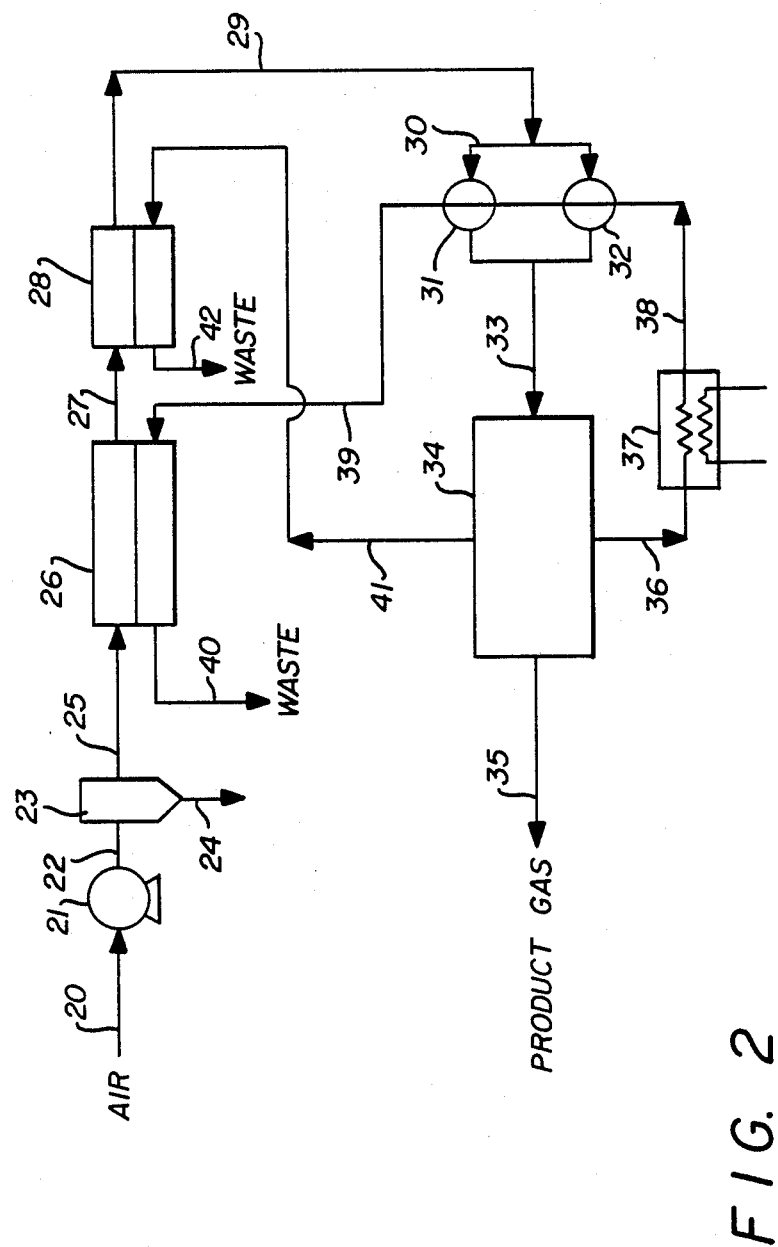
FIG. 2 is a schematic flow diagram of an embodiment in which purge gas removed from the absorbent bed prepurifier for the cryogenic system is employed as purge gas for a feed gas membrane drying system.

The embodiment illustrated in FIG. 2 addresses the need for minimizing the overall purge requirements of the system. In this embodiment, air in line 20 is compressed in air compressor 21, with the compressed air being passed in line 22 to coalescer unit 23, from which water is removed through line 24. The thus-treated compressed air stream is passed in line 25 to first stage membrane dryer 26, the first part of a two stage membrane dryer system. Most of the water still present in the feed air is removed in this first stage dryer, which is refluxed in the permeate side by a dry purge stream as hereinafter indicated. The partially dry, compressed feed air passes, as non-permeate gas, from first stage membrane dryer 26 through line 27 to second stage membrane dryer 28, wherein residual water is removed so that dry feed air is passed therefrom as a non-permeate stream for passage in line 29 to prepurifier adsorption system 30 for purification before passage to the cryogenic air separation system. Adsorption system 30 is shown as containing two adsorbent beds, namely bed 31 and bed 32, it being understood that one such bed will commonly be used for purification of dry feed gas while the other bed is undergoing regeneration. Dry, purified feed air leaving adsorption system 30 is passed in line 33 to cryogenic air separation system 34, from which the desired dry, high purity nitrogen or oxygen product is recovered through line 35. Dry waste gas from cryogenic system 34 is withdrawn through line 36, heated in heat exchanger 37, and passed through line 38 to prepurifier adsorption system 30 as purge gas for use in the regeneration of whichever bed, i.e. bed 31 or bed 32, is being regenerated at any given time. Since virtually all of the water present in the feed air is removed in the membrane dryer system, the spent purge gas exiting prepurifier adsorption system 30 will be relatively dry, although it will contain other contaminants such as carbon dioxide and hydrocarbons. Such spent purge gas is passed in line 39 to first stage membrane dryer 26 for use therein as purge gas on the permeate side of the membrane. Said purge gas, together with water vapor that permeates through said membrane dryer 26, is withdrawn through line 40 for discharge to waste. The passage of such recycle purge gas through membrane dryer 26 facilitates the carrying of said permeate water away from the surface of the membrane on said permeate side so that a high driving force is maintained across membrane dryer 26 to sustain the desired moisture removal from the feed air stream being passed to said membrane dryer 26.

Second stage membrane dryer 28 is used, in the FIG. 2 embodiment, to dry the feed air to higher levels than are achieved in first stage membrane dryer 26. For purging in this dryer, any dry, low pressure stream available from the cryogenic process, such as waste gas from cryogenic system 34, high purity nitrogen or oxygen product gas, expanded feed air or the like, or waste gas from prepurifier adsorption system 30, can be used as the dry purge gas. In FIG. 2, a portion of the cryogenic system 34 waste gas is shown as being passed through line 41 to second stage membrane dryer 28 for use as purge gas therein. Such purge gas facilitates the carrying away of the permeate water from the surface of the membrane on the permeate side of the membrane so that a high driving force is maintained across membrane 28 to sustain the desired additional drying of the feed air stream being passed to said membrane 28. Purge gas, together with additional permeate water, is withdrawn from membrane dryer through line 42.

Those skilled in the art will appreciate that the use of second stage membrane dryer 28 is optional, depending on the degree of feed air drying desired in any particular dry, high purity nitrogen and/or oxygen production operation. When employed, as in the FIG. 2 embodiment, second stage membrane dryer 28 will typically be smaller and require much less purge gas than first stage membrane dryer 26 because most of the water removal from the feed air occurs in the first stage membrane dryer system.

The FIG. 2 embodiment will be seen to be of advantage in that it enables the overall purge requirement of the process to be reduced in comparison to that of the FIG. 1 embodiment. Thus, if the total membrane dryer purge requirement is 20% and the pre purifier adsorption system 30 purge requirement is 15%, then, in such embodiment, only 5% of purge gas over and above that employed for pre purification would be required. Removal of virtually all of the water in the membrane dryer also greatly reduces the water load on the pre purifier adsorption system. This, in turn, greatly reduces the thermal energy required for pre purifier regeneration, making possible perhaps the use of compressor waste heat for prepurifier regeneration.

Since water is a very strongly adsorbed species in the prepurifier, the removal of most of the water from the prepurifier feed gas can result in improved adsorbent performance with respect to other species desired to be removed, such as carbon dioxide, hydrocarbons and the like. It will be appreciated that this could lead to desirably improved prepurifier operation. It should be noted that membrane dryers suitable for the removal of water will also generally be relatively selective for carbon dioxide removal. Such carbon dioxide removal will also reduce the load on the downstream adsorption unit.

It should also be noted that adsorption of water in the prepurifier is exothermic in nature and generates significant amounts of heat. This tends to raise the temperature of the air leaving the prepurifier which, in turn, increases the refrigeration load on the cryogenic system. Removal of the water from the prepurifier feed by use of the membrane dryer system will tend to greatly reduce the heat generated in the prepurifier adsorption system during adsorption therein, thus benefiting the downstream cryogenic process.

In the practice of the invention, therefore, it will be seen that membrane dryer systems can be effectively integrated with prepurifier adsorption cryogenic air separation systems so as to dry the feed air to said adsorption cryogenic systems in a manner representing a highly desirable advance over the conventional approaches commonly employed in the art. The membrane dryer system operation is enhanced by the use of purge gas on the permeate side of the membrane, with dry waste gas from the adsorption cryogenic system, or a portion of the dry, high purity nitrogen product stream from the cryogenic air separation system being passed to the membrane dryer system for use therein as said desired purge gas.

Certain membranes are known to selectively remove moisture from compressed feed air, nitrogen streams or the like. Unfortunately it has been found, as disclosed in U.S. Pat. No. 4,783,201, that, when operated in a crossflow permeation manner, such membranes may require a stage cut, i.e., the ratio of permeate gas to feed gas flow, of roughly 30% at, for example, 150 psig operation to achieve a relatively modest pressure dewpoint of $-40°$ F. Obviously, the product gas recovery of such a crossflow membrane unit would be quite low, and the power and dryer area requirements of such an overall system would be undesirably high. In order to enhance the benefits of the integrated systems in the practice of the invention, however, the membrane dryer system is desirably operated in a countercurrent manner, with dry reflux purge gas being passed on the permeate side of the membrane to facilitate the carrying away of moisture from said permeate side and the maintaining of a high driving force across the membrane for moisture removal. This processing feature serves to minimize the membrane area required and the product permeation loss necessary to achieve a given product dewpoint, i.e. level of drying. It is desirable in preferred embodiments of the invention, to maintain product loss due to co permeation of said nitrogen and oxygen from the feed air to less than 1%, preferably less than 0.5%, of the total product flow.

It will be appreciated that the membrane composition used in the dryer membrane system should be one having a high selectivity for water over nitrogen and oxygen. That is, moisture must be selectively permeated much more rapidly than air. The water/air separation factor should be at least 50, preferably greater than 1,000, for advantageous moisture removal from feed air. As indicated above, such a dryer membrane system will also have a carbon dioxide/air separation factor in the range of from about 10 to about 200. In addition, the membrane composition should have a relatively low permeability rate for both nitrogen and oxygen. Cellulose acetate is an example of a preferred membrane separation material satisfying such criteria. It will be appreciated that a variety of other materials can also be employed, such as ethyl cellulose, silicone rubber, polyurethane, polyamide, polystyrene and the like.

The membrane dryer system having a membrane material of desirable membrane composition, which is integrated with a pressure swing adsorption system and cryogenic air separation system as disclosed and claimed herein, is preferably operated in a countercurrent flow pattern as indicated above. In a hollow fiber membrane configuration or in other suitable membrane configurations, e.g. spiral wound membranes, bundle designs providing for flow patterns of the cross flow type have been commonly employed in commercial practice. In cross-flow operation, the flow direction of permeate gas on the permeate side of the membrane is at right angles to the flow of feed gas on the feed side of the membrane. For example, in the use of hollow fiber bundles and the passage of feed gas on the outside of the hollow fiber membranes, the flow direction of permeate in the bores of the fibers is generally at right angles to the flow of feed over the external surface of the hollow fibers. Likewise, in the inside out approach in which the feed gas is passed through the bores of the hollow fibers, the permeate gas generally passes from the surface of the hollow fibers in a direction generally at right angles to the direction of the flow of feed within the bores of the hollow fibers and then, within the outer shell, in the direction of the outlet means for the permeate gas. As shown in European Patent Application Publication No. 0 226 431, published June 24, 1987, countercurrent flow patterns can be created by the encasing of the hollow fiber bundle within an impervious barrier over the entirety of its longitudinal outer surface except for a non-encased circumferential region near one end of said bundle. This enables the feed gas or permeate gas, depending on the desired manner of operation, i.e. inside-out or outside-in, to pass in countercurrent flow outside the hollow fibers parallel to the flow direction of permeate gas or feed gas in the bores of the hollow fibers. The feed gas on the outside of the hollow fiber bundle, for example, is caused to flow parallel to, rather than at right angle to, the central axis of the fiber bundle. It will be understood that the membrane fibers may be organized either in straight assemblies parallel to the central axis of the bundle, or alternatively, can be wound in helical fashion around the central axis. In any event, the impermeable barrier material may be a wrap of impervious film, e.g., polyvinylidene or the like. Alternatively, the impermeable barrier may be an impervious coating material, e.g. polysiloxane, applied from an innocuous solvent, or a shrink sleeve installed over the membrane bundle and shrunk onto said bundle. The impermeable barrier thus encases the hollow fiber or other membrane bundle and, as disclosed in said publication, has an opening therein permitting the flow of gas into or from the bundle so that the fluid flows in a direction substantially parallel to the axis of the fiber bundle. For purposes of the invention, the flow pattern should be one of countercurrent flow of the wet feed air stream and the permeate gas comprising purge gas supplied as indicated above, together with moisture that permeates through the membrane material in the membrane dryer system.

It should be noted that membrane drying operations are commonly carried out in the art using a dense fiber membrane. The membrane thickness for such a dense fiber is also the wall thickness, and is very large in comparison to the skin portion of an asymmetric membrane or to the separation layer of a composite membrane. For a dense fiber, it is necessary to have a large wall thickness to achieve a significant pressure capability. Thus, dense fibers have a very low permeability rate and require the use of a very large surface area for adequate drying of the nitrogen product. By contrast, asymmetric or composite membranes, preferred over dense membranes for purposes of the invention, have very thin membrane separation layers, with the relatively more porous substrate portion of said membranes providing mechanical strength and support for the very thin portion that determines the separation characteristics of the membrane. Much less surface area is required, therefore, for asymmetric or composite membranes than for dense, homogeneous membranes. Because of the inherently improved permeability obtainable by the use of asymmetric or composite membranes rather than dense membranes, it is desirable to further enhance asymmetric and composite membrane performance in preferred embodiments of the invention, as related to the drying of feed air, so as to achieve a significant reduction in the loss of valuable feed air by co-permeation that would occur in cross-flow operation of such membranes.

It will be understood that the cryogenic air separation system employed for purposes of the invention can be any conventional, commercially available system capable of producing high purity nitrogen and/or oxygen in desirable quantities by the cryogenic rectification of air. The details of the cryogenic air separation system are not a part of the essence of the invention, relating to the integration of the cryogenic system with a membrane dryer system and with a conventional prepurifier adsorption system. Representative examples of such cryogenic air separation technology are disclosed in the Cheung patent, U.S. 4,448,545, the Pahade et. al. patent, U.S. 4,453,957, and the Cheung patent, U.S. 4,594,085. Similarly the prepurifier adsorption system employed in the practice of the invention comprises any desirable adsorption system well known in the art and capable of removing undesired contaminants from the dry feed air stream before its passage to the cryogenic air separation system. The prepurifier adsorption system employed can be any convenient, commercially available system capable of removing carbon dioxide and/or other contaminants, including residual water, from the dry feed air stream. The adsorption system is commonly a pressure swing adsorption system operated so as to selectively adsorb said contaminants from the feed air at an elevated pressure and to desorb said contaminants at lower pressure, e.g. near ambient pressure, for removal from the system. Such pressure systems typically employ a pair of adsorbent beds, with one bed being used for adsorption purposes while the other bed is being regenerated. Typical adsorbent materials employed in said beds include alumina, zeolite molecular sieves or silica gel. Alternately, such systems can be operated on a thermal swing adsorption cycle, wherein the desired adsorption is carried but at a lower temperature, with desorption being accomplished at an elevated temperature.

For purposes of the invention, a purge ratio, i.e. reflux purge gas/feed air flow on the non permeable side, of at least about 10%, but preferably about 20% or above, is desired to keep area requirements, product loss and back diffusion to a minimum. The purge ratio requirements also tend to be greater at relatively lower feed air pressures than at higher pressures.

In an illustrative example of the practice of the invention, the cryogenic air separation system is adapted to produce 50 tons of dry, high purity nitrogen. Since nitrogen recovery based on air in the conventional prepurified cryogenic system is typically on the order of 52%, approximately 48% of the feed air flow is available as low pressure waste. The cryogenic system can conveniently be operated with a feed air pressure of 91 psia, at an air temperature of 115° F., with a waste gas pressure of 18 psia. In a conventional system, an aftercooler dewpoint of 115° F., chiller product air dewpoint of 40° F., and an absorbent product air dewpoint of $-100°$ F. can conveniently be employed. A conventional mechanical chiller for use in such a system would cost approximately $30,000 and consume about 10 KW of electrical power. The air pressure drop in such a chiller and moisture separator would be on the order of about 2 psi. The chiller is desirably replaced in the practice of the invention, as in the FIG. 1 embodiment, with a membrane dryer system having an oxygen/nitrogen separation factor of 5.9, and a water/air separation factor of 1,000 or more. The membrane dryer system is desirably comprised of hollow fiber membranes wound in a helical configuration, and operated using an impervious barrier of polyvinylidene to encase the membrane and create a countercurrent flow pattern. In order to minimize the amount of compressed air lost due to permeation during the drying operation, the stage cut, i.e. permeate/feed flow, of the membrane is kept very low. However, it should be recognized, as indicated above, that a portion of the actual operating stage cut is due to the desired rejection of water and is unavoidable if the desired drying is to be achieved. For enhanced drying, therefore, it is the dry stage cut resulting from the co-permeation of oxygen and nitrogen that is minimized, i.e. to not more than about 5%, preferably to less than 0.5% of the inlet feed air. A dry reflux purge ratio on the order of 18-20% is used under the particular operating conditions and membrane characteristics referred to above. The membrane dryer system is found to achieve a significant reduction in capital and power costs, and other benefits, provided that said dry flux purge ratio of at least 18% is available.

An added advantage of the membrane dryer system is that it is not limited to providing a 40° F. air dewpoint feed to the adsorption-cryogenic system. A given membrane area can be used to provide air of varying quality depending on the purge ratio employed and the membrane characteristics. The residual water concentration of the dried air can be reduced by the use of more purge gas, or membranes with higher water separation characteristics, apart from the use of increased membrane area. Any such reduction in residual water content will serve to reduce the amount of water vapor that must be removed by the adsorbent beds in the prepurifier adsorption system, thereby increasing the capacity of said system and reducing the purge gas and energy requirements thereof. The optimum membrane dryer dewpoint will thus be seen to depend on the relative cost of removing water in the membrane dryer system and in the prepurifier adsorption system.

It will be appreciated that various changes and modifications can be made in the details of the process and system as herein described without departing from the scope of the invention as set forth in the appended claims. Thus, asymmetric or composite membrane structures can be employed in the dryer membrane system of the invention. While dense membranes are commonly used for product drying applications, such dense membranes are not preferred because of the inherent limitations thereof noted above, although they can be used in the practice of the invention.

The permeable membranes employed in the practice of the invention will commonly be employed in assemblies of membrane bundles, typically positioned within enclosures to form membrane modules that comprise the principal element of a membrane system. A membrane system may comprise a single module or a number of such modules, arranged for either parallel or series operation. The membrane modules can be constructed using bundles of membranes in convenient hollow fiber form, or in spiral wound, pleated flat sheet, or other desired membrane configurations. Membrane modules are constructed to have a feed air side, and an opposite, permeate gas exit side. For hollow fiber membranes, the feed side can be either the bore side for inside out operation, or the outside of the hollow fibers for outside in operation. Means are provided for introducing feed air to the system and for withdrawing both permeate and non permeate streams.

As indicated above, the purge gas employed in the invention should be a dry or a relatively dry gas, as from the sources referred to herein. As used herein, a relatively dry purge gas is one having a moisture partial pressure not exceeding the partial pressure of moisture in the dried feed air stream. Preferably, said purge gas moisture partial pressure will be less than half the moisture partial pressure in said stream, as will be the case with respect to the sources of purge gas disclosed above.

Membranes will be seen to provide a highly desirable system and process for drying feed air before its passage to air adsorption-cryogenic air separation system for the production of dry, high purity nitrogen. By accomplishing the drying in convenient membrane systems, the use of the more costly chillers for moisture removal can be avoided. By integrating the processing streams of the membrane dryer system with the cryogenic air separation system and the prepurifier adsorption system, a purge of the low pressure, permeate side of the membrane dryer system with relatively dry purge gas is conveniently accomplished. By utilizing a bundle arrangement so as to establish a countercurrent flow pattern, preferred embodiments of the drying operation can be carried out with an enhanced recovery of dry feed air, avoiding the co-permeation of significant amounts of compressed air as occurs in cross-flow permeation operations.

What is claimed

1. An improved system for the production of dry, high purity nitrogen and/or oxygen from air comprising:
    (a) a membrane dryer system capable of selectively permeating water present in wet feed air;

(b) a prepurification adsorption system capable of selectively adsorbing carbon dioxide, residual water and other contaminants from dry feed air removed as non permeate gas from said membrane dryer system;

(c) a cryogenic air separation system for the cryogenic rectification of air, and the production of dry, high purity nitrogen and/or oxygen product gas, together with a dry waste gas;

(d) conduit means for passing relatively dry purge gas to the low pressure permeate side of the membrane dryer system to facilitate the carrying away of water vapor from the surface of the membrane and maintaining the driving force for removal of water vapor through the membrane from the feed air stream for enhanced moisture separation therefrom, said relatively dry purge gas comprising waste or product gas from said cryogenic air separation system and/or the prepurifier adsorption system or ambient air, whereby the provision of purge gas on the permeate side of the membrane dryer system facilitates the desired moisture removal with minimum loss of feed air.

2. The system of claim 1 in which said membrane dryer system contains membrane bundles adapted for a countercurrent flow pattern with the permeate gas flowing generally parallel to the flow of wet feed air.

3. The system of claim 1 in which said dry purge gas for the membrane dryer system comprises waste gas from said cryogenic air separation system.

4. The system of claim 3 and including conduit means for passing a portion of said waste gas from the cryogenic air separation system to said prepurifier adsorption system as purge gas therefor.

5. The system of claim 1 and including conduit means for passing waste gas from said cryogenic air separation system to said prepurifier adsorption system as purge gas therefor, the waste gas from said prepurifier adsorption system comprising said purge gas for the membrane dryer system.

6. The system of claim 5 in which said membrane dryer system comprises a two-stage membrane system, said waste gas from the prepurifier adsorption system being passed to the first stage of said membrane system as purge gas.

7. The system of claim 6 and including additional conduit means to pass waste or product gas from said cryogenic air separation system or expanded air to the second stage of said membrane system as purge gas.

8. The system of claim 5 in which said membrane dryer system contains membrane bundles adapted for a countercurrent flow pattern with the permeate gas flowing generally parallel to the flow of wet feed air.

9. An improved process for the production of dry, high purity nitrogen and/or oxygen from air comprising:

(a) passing wet feed air to a membrane dryer system capable of selectively permeating water therefrom;

(b) passing the thus dried feed air to a pre-purification adsorption system capable of selectively adsorbing carbon dioxide, residual water and other contaminants from dry feed air removed as non-permeate gas from said membrane dryer system;

(c) passing the dry, pre-purified feed air from said pre-purification adsorption system to a cryogenic air separation system for the cryogenic rectification of air, and the production of dry, high purity nitrogen product gas, together with a dry, oxygen-containing waste gas;

(d) recovering dry, high purity nitrogen product gas from said cryogenic air separation system; and (e) passing relatively dry purge gas to the low pressure permeate side of the membrane dryer system to facilitate the carrying away of water vapor from the surface of the membrane and maintaining the driving force for removal of water vapor through the membrane from the feed air stream for enhanced moisture separation therefrom, said relatively dry purge gas comprising waste or product gas from said cryogenic air separation system and/or the prepurifier adsorption system or ambient air, whereby the provision of purge gas on the permeate side of the membrane dryer system facilitates the desired moisture removal with minimum loss of feed air.

10. The process of claim 9 in which said membrane dryer system contains membrane bundles adapted for a countercurrent flow pattern with the permeate gas flowing generally parallel to the flow of wet feed air.

11. The process of claim 9 in which said dry purge gas for the membrane dryer system comprises waste gas from said cryogenic air separation system.

12. The process of claim 11 and including passing a portion of said waste gas from the cryogenic air separation system to said prepurifier adsorption system as purge gas therefor.

13. The process of claim 9 and including passing waste gas from said cryogenic air separation system to said prepurifier adsorption system as purge gas therefor, the waste gas from said pre-purifier adsorption system comprising said purge gas for the membrane dryer system.

14. The process of claim 13 in which said membrane dryer system comprises a two-stage membrane system, and in which waste gas from the prepurifier adsorption system is passed to the first stage of said membrane system as purge gas.

15. The process of claim 14 and including passing waste or product gas from said cryogenic air separation system or expanded air to the second stage of said membrane system as purge gas.

16. The process of claim 15 in which waste gas from the cryogenic air separation system is passed to the second stage of said membrane system as purge gas.

17. The process of claim 13 in which said membrane dryer system contains membrane bundles adapted for a countercurrent flow pattern with the permeate gas flowing generally parallel to the flow of wet feed air.

* * * * *